United States Patent [19]
Meyding

[11] 3,905,119
[45] Sept. 16, 1975

[54] DEVICE FOR TESTING THE CONTOUR OF AN OBJECT

[75] Inventor: Lothar Meyding, Wetzler, Germany

[73] Assignee: Ernst Leitz GmbH

[22] Filed: Mar. 29, 1974

[21] Appl. No.: 456,433

Related U.S. Application Data

[63] Continuation of Ser. No. 244,555, April 17, 1972, abandoned.

[30] Foreign Application Priority Data
Apr. 21, 1971 Germany............................ 2119337

[52] U.S. Cl. .......................... 33/179.5 R; 33/174 L
[51] Int. Cl.² ...................... G01B 5/20; G01B 7/28
[58] Field of Search. 33/179.5 R, 179.5 A, 179.5 D, 33/179.5 E, 174 L

[56] References Cited
UNITED STATES PATENTS

| | | | |
|---|---|---|---|
| 2,775,041 | 12/1956 | Pomernacki .................... | 33/179.5 R |
| 3,188,745 | 6/1965 | Gates et al. .................... | 33/179.5 R |
| 3,494,043 | 2/1970 | Hofler ............................ | 33/179.5 A |
| 3,636,635 | 1/1972 | Lemelson ....................... | 33/174 L |
| 3,800,423 | 4/1974 | Munro et al. ................... | 33/179.5 R |

FOREIGN PATENTS OR APPLICATIONS
1,229,373    4/1971    United Kingdom............ 33/179.5 A

*Primary Examiner*—Harry N. Hardian
*Assistant Examiner*—Richard R. Stearns
*Attorney, Agent, or Firm*—Gilbert L. Wells

[57] ABSTRACT

A device for testing the contour of an object by determining the relative locations of test portions on the contour. In this device means are provided for moving the object to be tested through the idle path at a high speed and for bringing about the testing contact at a considerably lower speed. To this end, a first and a second sensor are so moved into the range of the object that the second sensor is within the range of the object contour and the first sensor is within the range of the test portions. The object is then moved along a testing path at a first speed until the second sensor is engaged by the contour, thereby actuating a control device and causing the object to be driven thereafter at a second speed which is slower than the first speed. At this slower speed the test portions are allowed to engage the first sensor for sensing the location of this particular test portion.

8 Claims, 6 Drawing Figures

DEVICE FOR TESTING THE CONTOUR OF AN OBJECT

This is a continuation of Application Ser. No. 244,555, now abandoned, filed Apr. 17, 1972.

BACKGROUND OF THE INVENTION

The present invention relates to a device for testing objects such as gear wheels. The device may be used, for example, to test the pitch of spur wheels, the results being fed to a plotter.

Prior methods and apparatus have been suitable only for testing bodies of rotation which have incisions spaced uniformly from one another on their circumference. Furthermore, such methods and apparatus have required a low speed of drive of the object being tested, a correspondingly long time being required for the testing procedure. It is, therefore, an object of the invention to provide a testing device which works at a considerably higher speed.

SUMMARY OF THE INVENTION

The above stated object is attained by a device wherein the object to be tested is so mounted that the test portions are movable along a testing path either at a first speed or at a second speed lower than the first speed. Further, wherein a first and a second sensor are advanced to reach a position in which the second sensor is within range of the contour of the object and the first sensor is within range of one of the test portions, and wherein the the test portions are caused to move along the testing path at a first speed to cause the contour of the object to engage the second sensor and thereby to actuate a control device to cause the test portions to be driven thereafter at the second speed, and wherein one test portion is at the second speed allowed to engage the first sensor and thus to cause the first sensor to sense the location of that test portion.

The device, therefore, comprises a support so to support such an object that its test portions are movable along a testing path, a first sensor mounted to be advanced to within range of one of the test portions when the object is present, a second sensor mounted to be advanced to within range of the contour of the object, drive means to drive the test portions along the testing path either at a first speed or at a second speed lower than the first speed, and a control device to select the first speed or the second speed respectively, the arrangement being such that engagement of the contour of the object with the second sensor during operation of the drive means at the first speed causes the control device to select the second speed for subsequent operation of the drive means, and that during said subsequent operation engagement of said one test portion with the first sensor causes the first sensor to sense the location of that test portion.

The device may comprise a signal generator so arranged that movement of the first sensor through a reference position actuates the signal generator to cause a signal representative of the location of said one test portion when the first sensor is at the reference position to be applied to indicating means, in which case the signal generator may comprise a null detector or a pick-up device.

The first sensor may be adjustably mounted on a carrier.

Preferably, the second sensor is adjustably mounted on a carrier.

In one construction the carrier is mounted to be reciprocable relatively to a base member, a stop being provided to limit the stroke length of the carrier, while in another construction the carrier is mounted to be pivotable relatively to a base member.

The second sensor may comprise a mechanical feeler movable with at least one degree of freedom.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
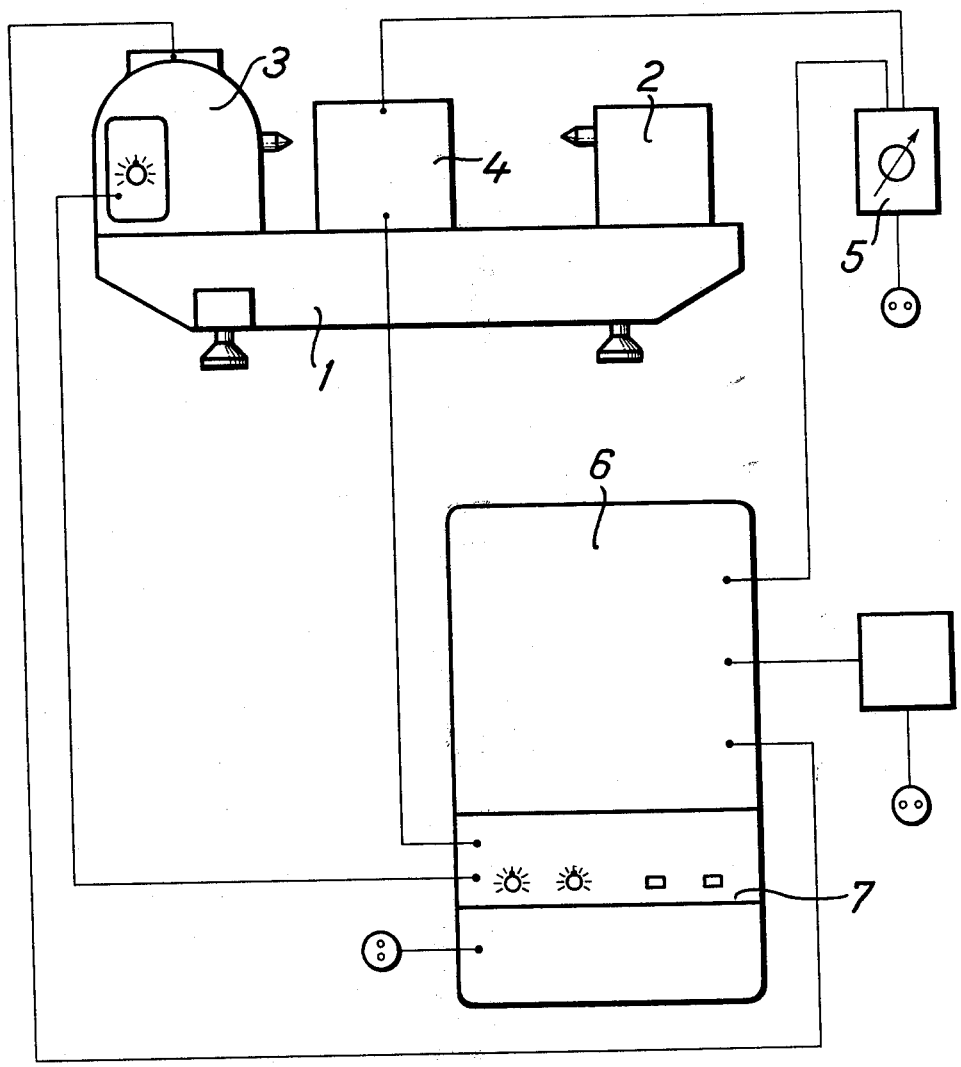
FIG. 1 shows a pitch measuring device in schematic representation.

Pitch measuring devices are generally used, during the testing of a spur wheel, for example to measure the spacings of consecutive corresponding tooth flanks at positions on the circumference of the pitch circle of the spur wheel, these measurements being used to determine the corresponding sector angles, to compare these with the prescribed ideal values, and to plot the results.

The described embodiment of pitch measuring device has a base bed 1 with a tailstock 2 and a digital indexing head 3, which can receive a test piece (not shown) between their centres. In the region between the centres there is provided an arrangement including first and second sensors for the scanning of successive test portions of the test piece. This arrangement is designated in its entirety by reference numeral 4. The arrangement 4 which will be more fully described below, comprises a signal generator, the output signals of which are fed via electronic circuitry 5 to a plotter 6. From the plotter 6 they reach a printer or a tape printer. The signal generator is designated with reference numeral 8, and with it is associated, as is more fully described below, a probing device, the output signals of which serve to bring the signal generator 8 into the range of each test portion to be examined, by means of a control device 7, and then in this range to reduce the rotational speed of the test piece, i.e. the rotational speed of a drive motor provided to rotate the tailstock 2.

A first sensor 9 and a second sensor 11 are associated with the signal generator 8 and the probing device 10 respectively. The sensors 9 and 11 are constructed in the illustrated embodiment as mechanical feelers, and the generator 8 and probing or scanning device 10 both rest on a carrier 12 which is displaceably mounted on a supporting device 13. Ball bearings (not shown) are provided to mount the carrier 12 on the supporting device 13. The supporting device 13 is securable by a clamping device 14, on a stand 15. The height of the supporting device 13 relatively to the stand 15 is adjustable by means of the clamping device 14.

A drive for the carrier 12 is accomodated on the supporting device 13. The drive comprises a motor 16 and crank gearing 17. The drive and the carrier 12 are coupled elastically with one another. The possible movement of the carrier 12 relative to the supporting device 13 is limited to linear reciprocation, and an adjustable stop 18 is provided to limit the movement of the carrier 12 in a direction towards the test piece, so that after the carrier 12 is advanced towards the test piece, as described more fully below, a ball member at the end of the measuring feeler 9 comes to rest at a location on the circumference of the pitch circle of the test piece. The probing device is provided with two microswitches, which are actuated in common by the feeler 11. For this purpose, the feeler 11, which acts as a switching feeler, has two degrees of freedom. In one degree of freedom, i.e. linear movement of the feeler 11 in the direction of the movement of the carrier relative to the supporting device, the feeler 11 actuates a switch, which controls the movement of the carrier by actuating and de-actuating the drive motor. In the other degree of freedom, i.e. the pivotal movement of the feeler 11 about the horizontal axis, it actuates a second switch which changes over and back again the rotary movement of the indexing head 3 from the fast running mode to the slow running mode.

The operation of the device will now be described with reference to one cycle of the measuring procedure.

Figure 2:
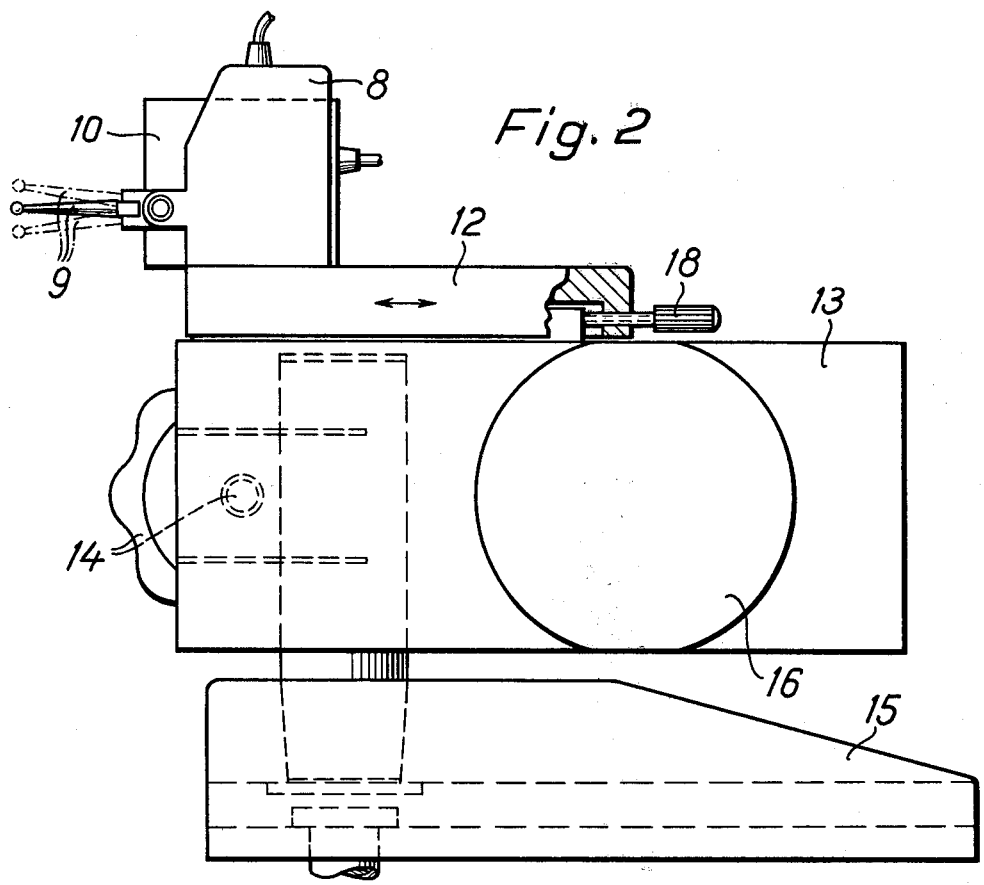
FIG. 2 shows the first and second sensors and associated parts of the device of FIG. 1 in side elevation.
Figure 3:
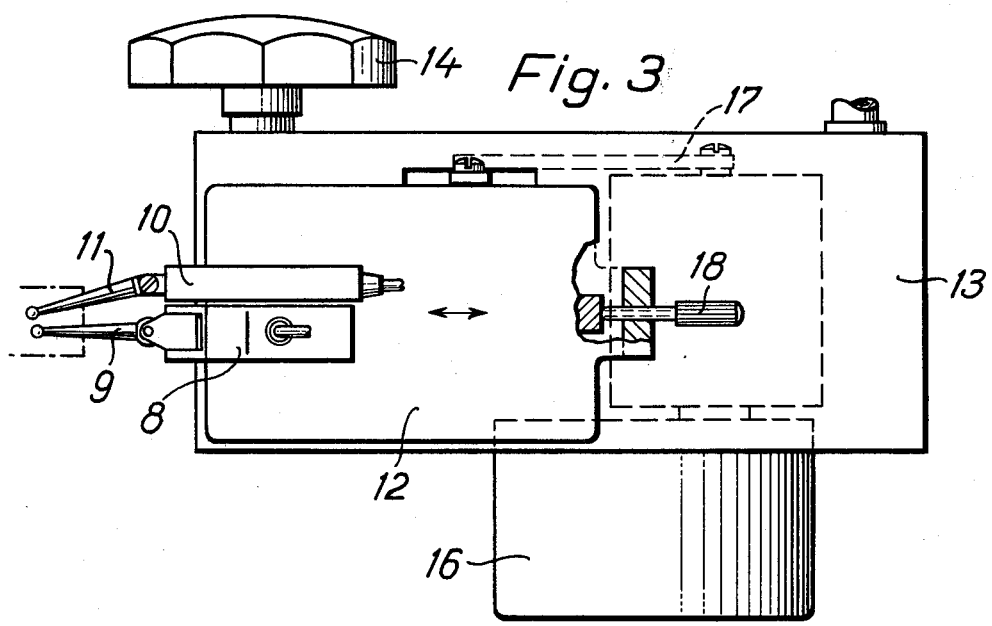
FIG. 3 shows the parts of the device shown in FIG. 2, but in top plan view.
Figure 4A:
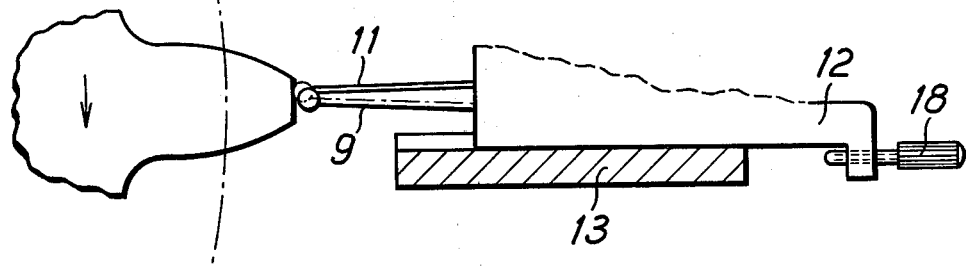
FIGS. 4a, 4b and 4c show the first and second sensors in three different positions relative to a spur wheel being tested for its pitch.
Figure 4B:
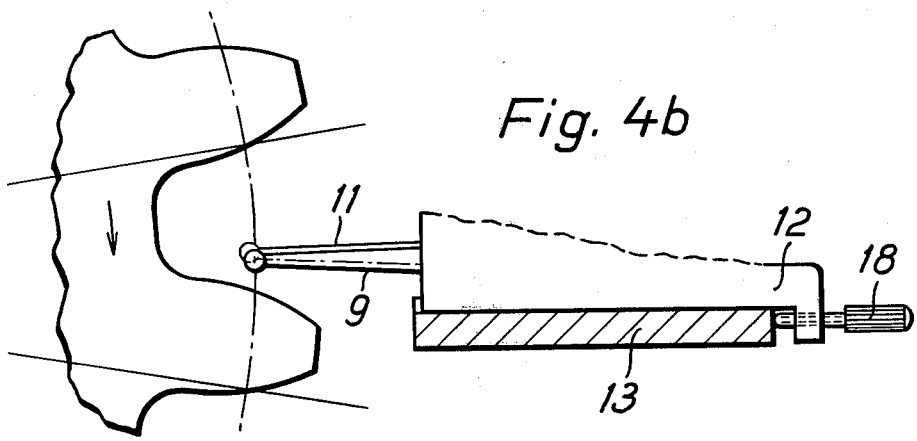
Figure 4C:
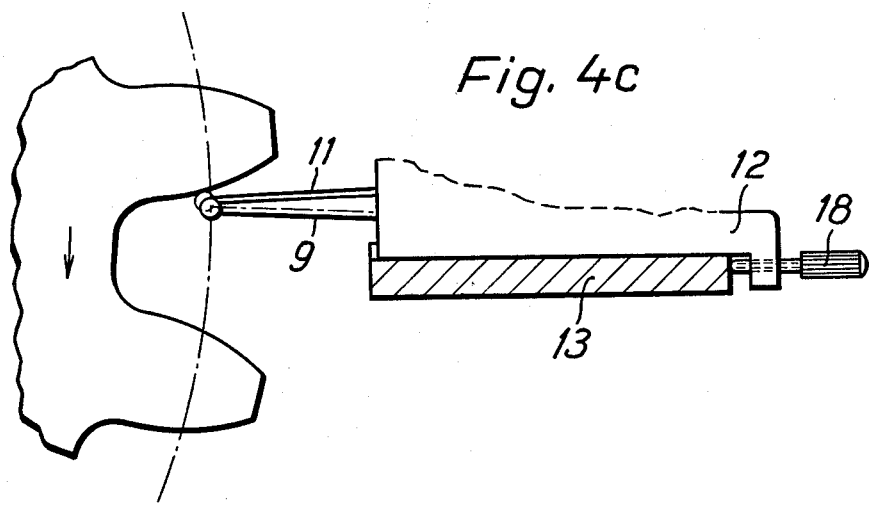

Before commencement of the measuring procedure, the carrier is situated in its rear end position, i.e. in its position farthest to the right in FIGS. 2 and 3, so that the feelers 9 and 11 are both situated at a distance from the test piece. The test piece, coupled with the indexing head 3, is itself in such a position that the feelers 9 and 11 are opposite a tooth tip of the test piece. Upon actuation of a starting key (not shown), the support is set into motion in a direction towards the tooth tip (to the left in FIGS. 2 and 3), and simultaneously the test piece begins, while driven by the motor of the indexing head, to rotate in the fast running mode. When the feeler 11 touches the tooth tip, as is shown in FIG. 4a, then by this contact the forward movement of the carrier 12 is interrupted, but the test piece continues to rotate in the fast running mode. As soon as the feeler 11 senses a tooth gap, the motor driving the carrier 12 is set into motion again, until the carrier 12 rests against the stop 18, at which time the ball member of the feeler 9 is situated at a point in the circumference of the pitch circle of the test piece, and adopts the position shown in FIG. 4b. A short time thereafter, the motor driving the carrier 12 is switched off. During this procedure no forcing can occur, since the drive motor and the carrier are coupled elastically with one another. The test piece continues to rotate further in the fast running mode, until the feeler 11, which is so arranged as to touch the tooth flank in front of the feeder 9 impinges first on this flank. Upon the occurrence of this contact, shown in FIG. 4c, the indexing head drive is switched over to the slow running mode. During the slow running mode, the feeler 9, which is pressed against the tooth flank by resilient means, likewise comes into contact with the tooth flank, and during the further rotation of the test piece is moved into its null position. During passage through the null position, the signal generator triggers a pulse, which feeds into a plotter 6 a signal corresponding to the angular setting of the indexing head 3 at the time when the null position of the signal generator 8 is established.

As soon as this pulse has occurred, the motor provided to advance the carrier 12 starts up again, to bring the carrier 12 back into its rear end position (the position farthest to the right in FIG. 3). In this position, a limit switch (not shown) is actuated, which switches the motor of the indexing head 3 back again to the fast running mode. This procedure is repeated according to the requirements of the measurements to be conducted, until the apparatus automatically switches itself off after a complete 360° rotation of the test piece.

In the use of the embodiment described above, in the absence of ideal values, a pure actual value measurement may be carried out. In this case the signal generator operates as a null detector which interrogates the actual angle values, as a reference input. On the other hand, if ideal values are known, then these can be fed into the plotter, for example by means of perforated tape in the case of non-uniform pitch or numbers or roller regulators in the case of uniform pitch.

The plotter in this case works out the difference between corresponding actual and ideal values, and then gives out directly the pitch error. Since actual and ideal values are both indicated in angular scale, the error is also given inangular scale.

When the signal generator is used with a measuring probe as described above, and control of the input procedure takes place by using the ideal angle as a reference input, the measurement signal produced represents the error magnitude directly, but in arcuate scale.

The above description shows the application of the device to the measurement of spur wheels, but if desired, other bodies of rotation such as grooved cams, hobs and circular saws may be tested in a similar manner. However, the device can also be applied to test pieces of linear configuration, such as toothed racks, cam rails and other objects. When such objects are tested, instead of the rotation of the test piece, rectilinear advance of the test piece is employed.

With the described embodiment, it is possible to examine bodies which have incisions spaced around the contour of the body at either uniform or non-uniform intervals. It is thus possible to use the device for the testing of grooved cams, as mentioned above, which can be provided with non-uniformly spaced incisions. The duration of the examination procedure using the device may be essentially shortened.

What is claimed is:

1. A measuring apparatus for determining the relative position of test portions on the contour of an object comprising:
   a. a base member;
   b. chucking means for holding said object and moving said contour with respect to said base member along a testing path;
   c. carrier means adjustably supported on the base member of said measuring apparatus for movement toward and away from said chucking means;
   d. a first sensor mounted on said carrier means for being positioned within the range of said test portions;
   e. a second sensor mounted on said carrier means for being positioned within the range of said contour and said test portions to contact said contour and said test portions prior to the engagement thereof by said first sensor;

f. drive means for driving said test portions along said testing path at a first speed and at a second speed lower than said first speed; and g. a control device electrically connected with said sensors and said drive means wherein engagement of said second sensor with said contour of said object causes said control device to switch said first speed to said second speed and simultaneously actuates means for sensing with said first sensor the location of one of said test portions as a function of the position of said test portions along said testing path.

2. A device as claimed in claim 1, wherein a support mounted on said base member adjustably mounts said carrier means for movement toward and away from said chucking means, and has mounted thereon means for advancing said carrier means toward said chucking means.

3. A device as claimed in claim 2, wherein said carrier means is mounted to be reciprocable relative to said support and a stop is provided to limit the stroke length of said carrier means.

4. A device as claimed in claim 2, wherein said support is mounted to be pivotable relative to said base member.

5. A device as claimed in claim 1, wherein said means for sensing comprises indicating means and a signal generator actuated by the movement of said first sensor through a reference position for generating a signal representative of the position of said one test portion with respect to said testing path when said first sensor is located at the reference position to be applied to said indicating means.

6. A device as claimed in claim 5, wherein the signal generator comprises a null detector.

7. A device as claimed in claim 5, wherein the signal generator comprises a pick-up device.

8. A device as claimed in claim 1, wherein the second sensor comprises a mechanical feeler movable with at least one degree of freedom.

* * * * *